Nov. 10, 1959 L. E. SODERQUIST 2,911,670
TIRE REMOVING MECHANISM FOR DIAPHRAGM PRESSES
Filed July 11, 1957 7 Sheets-Sheet 1

INVENTOR.
LESLIE E. SODERQUIST
BY
ATTORNEYS

Nov. 10, 1959 L. E. SODERQUIST 2,911,670
TIRE REMOVING MECHANISM FOR DIAPHRAGM PRESSES
Filed July 11, 1957 7 Sheets-Sheet 2

INVENTOR.
LESLIE E. SODERQUIST
BY Ely, Frye & Hamilton
ATTORNEYS

FIG. 4
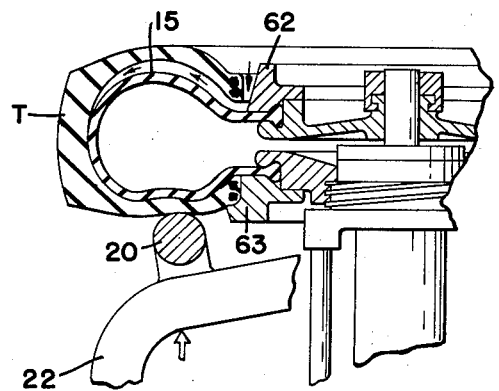
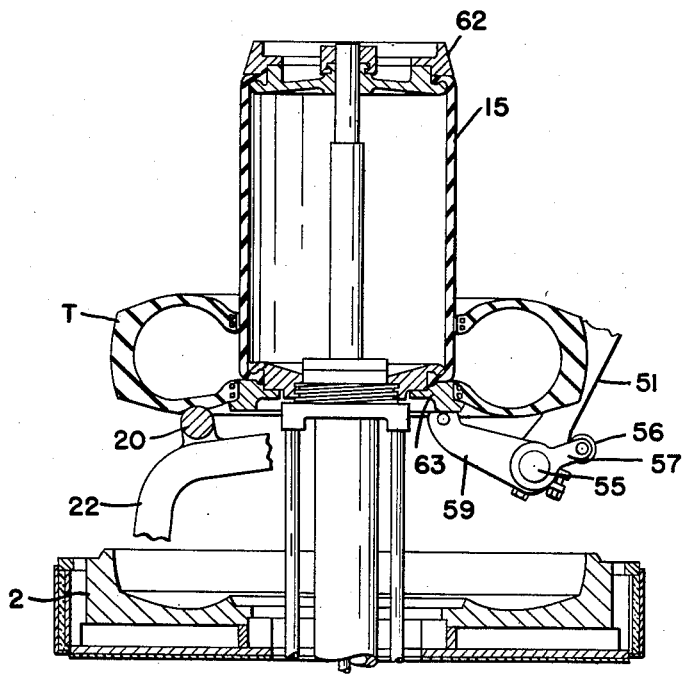
FIG. 5
INVENTOR.
LESLIE E. SODERQUIST
ATTORNEYS

Nov. 10, 1959 L. E. SODERQUIST 2,911,670
TIRE REMOVING MECHANISM FOR DIAPHRAGM PRESSES
Filed July 11, 1957 7 Sheets-Sheet 4
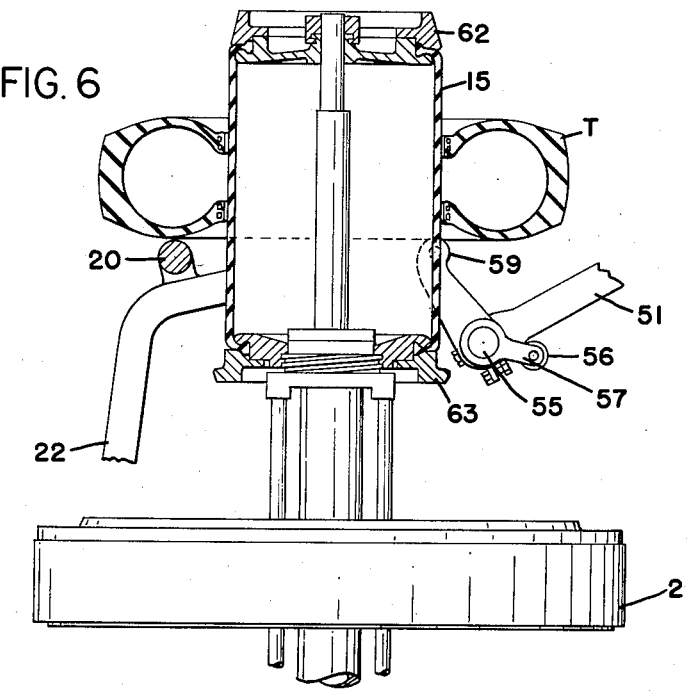
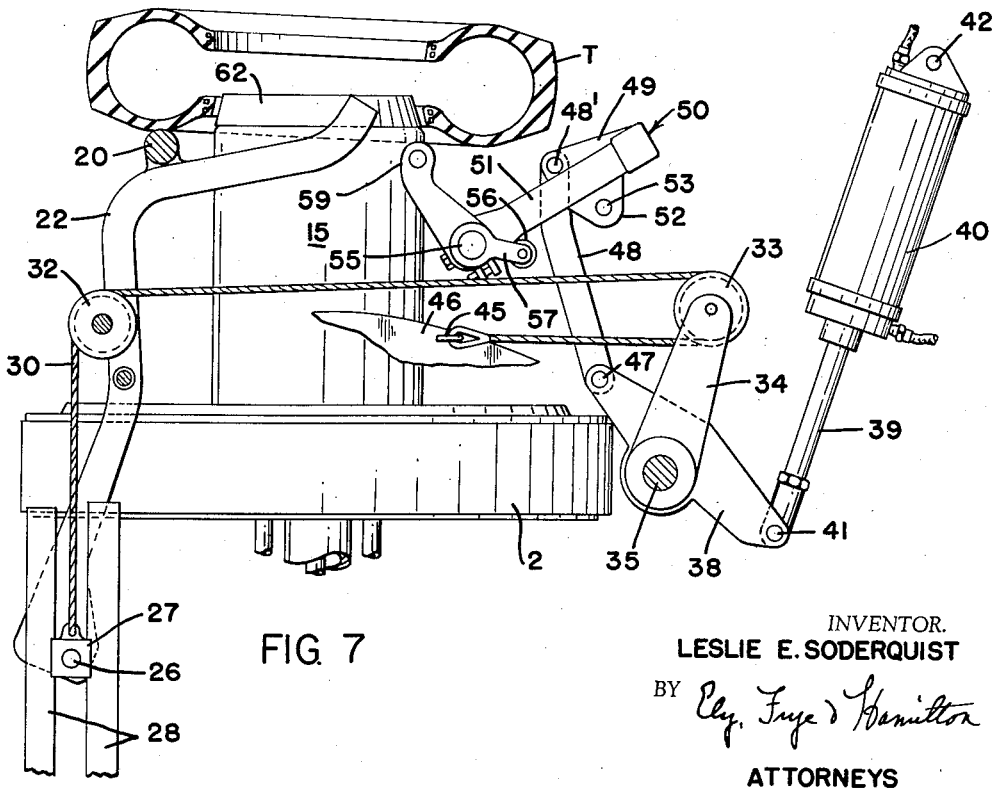
INVENTOR.
LESLIE E. SODERQUIST
ATTORNEYS

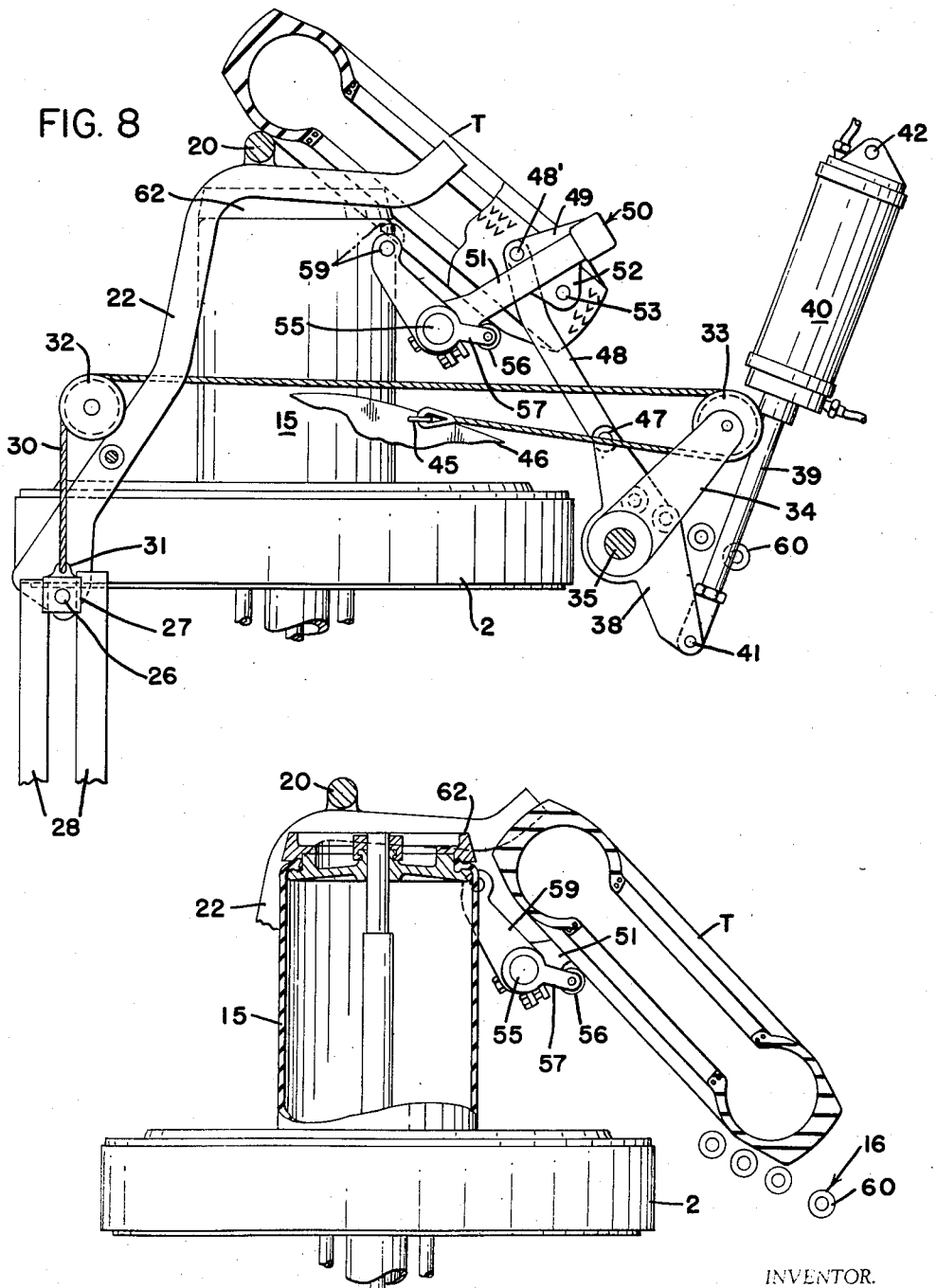

INVENTOR.
LESLIE E. SODERQUIST
BY Ely, Fryer & Hamilton
ATTORNEYS

INVENTOR.
LESLIE E. SODERQUIST
ATTORNEYS

United States Patent Office 2,911,670
Patented Nov. 10, 1959

2,911,670

TIRE REMOVING MECHANISM FOR DIAPHRAGM PRESSES

Leslie E. Soderquist, Silver Lake, Ohio, assignor to The McNeil Machine & Engineering Company, Akron, Ohio, a corporation of Ohio Application July 11, 1957, Serial No. 671,319

10 Claims. (Cl. 18—2)

The invention relates to apparatus for removing cured tires from vulcanizing presses utilizing a diaphragm or air bag for shaping and curing.

The mechanism shown herein may be used in presses into which the uncured bands are manually placed over the forming mechanism, or the mechanism may be a part of a completely automatic loading and unloading apparatus such as shown in applicant's copending application Serial No. 567,555, filed February 24, 1956.

The mechanism for opening and closing the press is not part of this invention, the type of such mechanism being shown in applicant's U.S. Patent No. 2,808,618. Such mechanism moves the upper mold section in a vertical path during the last part of the closing movement and the first part of the opening movement of the press, and during the remainder of the press operation the upper mold section is pivoted to clear the space above the forming mechanism and the cured tire. The expansible diaphragm shown herein is of the type disclosed in said Pat. No. 2,808,618, but other specific types may be employed within the scope of the invention defined in the appended claims.

The present invention has to do with the mechanism for stripping the cured tire from the diaphragm as the diaphragm is elongated to separate it from the cured tire after the press has been opened, and the present invention is in the nature of an improvement over the stripping mechanism disclosed in applicant's U.S. Patent No. 2,832,992, in which the cured tire is lifted out of the lower mold section by the elevation of the diaphragm while it is within the tire, and during the raising of the cured tire the stripping arms engage under the tire and move it upwardly as the diaphragm is elongated, to assist in the separation of the diaphragm from the tire. The elongated diaphragm is then returned to its seat in the lower mold section, whereupon the stripping mechanism ejects the cured tire from the press and returns to its idle position.

It has been found that the concurrent elevation of the stripping arms and the elongation of the diaphragm tends to damage the tire beads by causing buckling thereof because of the vacuum-tight seal between the diaphragm and the tire resulting from the forming and vulcanizing operation. This concurrent action causes the diaphragm to be forcibly pulled and stretched until the seal breaks between the diaphragm and the tire at the upper bead portion, and usually results in damaging the bead or the diaphragm or both.

The purpose of the present invention is to provide improved mechanism for stripping the diaphragm from the tire without injury to the tire beads or the diaphragm.

Other objects include the provision of improved mechanism for operating the tire elevating and ejecting arms.

The invention is disclosed herein as applied to a dual press in which two molds are opened and closed simultaneously, but it will be understood that the mechanism is equally well adapted for use in a single tire press, and the description herein will be mainly directed to one side of the press.

In the form of the invention shown, the tire is discharged at the rear of the press, but the mechanism may be reversed if a front discharge is desired. Accordingly, the terms "front" and "rear" as used in the specification and claims are to be construed as relative only.

The objects of the invention are accomplished by the improvements shown as a preferred form by way of example in the drawings and described in detail in the following specification. Various modifications and changes in details of construction are comprehended within the scope of the invention defined in the appended claims.

In the drawings:

Fig. 4 is an enlarged partial section similar to Fig. 3, showing the lifting arms engaging and supporting the tire.

Fig. 5 is a view similar to Fig. 4, showing the diaphragm elongated and stripped from the tire, while the tire is still supported by the lifting arms in the position of Fig. 4.

Fig. 6 is a similar view showing the tire being raised by the lifting arms.

Fig. 7 is a view showing the elongated diaphragm lowered to seat in the lower mold section, and the linkage for operating the front and rear lifting arms.

Fig. 8 is a view showing the position of the linkage in raising the front lifting arms to tilt the front end of the tire upwardly to discharge it rearwardly over the top of the elongated diaphragm.

Fig. 9 is a view similar to Fig. 8 showing the tire being discharged.

The bed 1 of the press supports the lower mold section 2, which may be chambered for circulation of steam. The upper chambered mold section 4 is carried by the cross head 5, which is raised and lowered by mechanism such as shown in said Patent No. 2,808,618, the outlines of the frame and certain operating parts being shown in Figs. 1 and 10.

Figure 1:
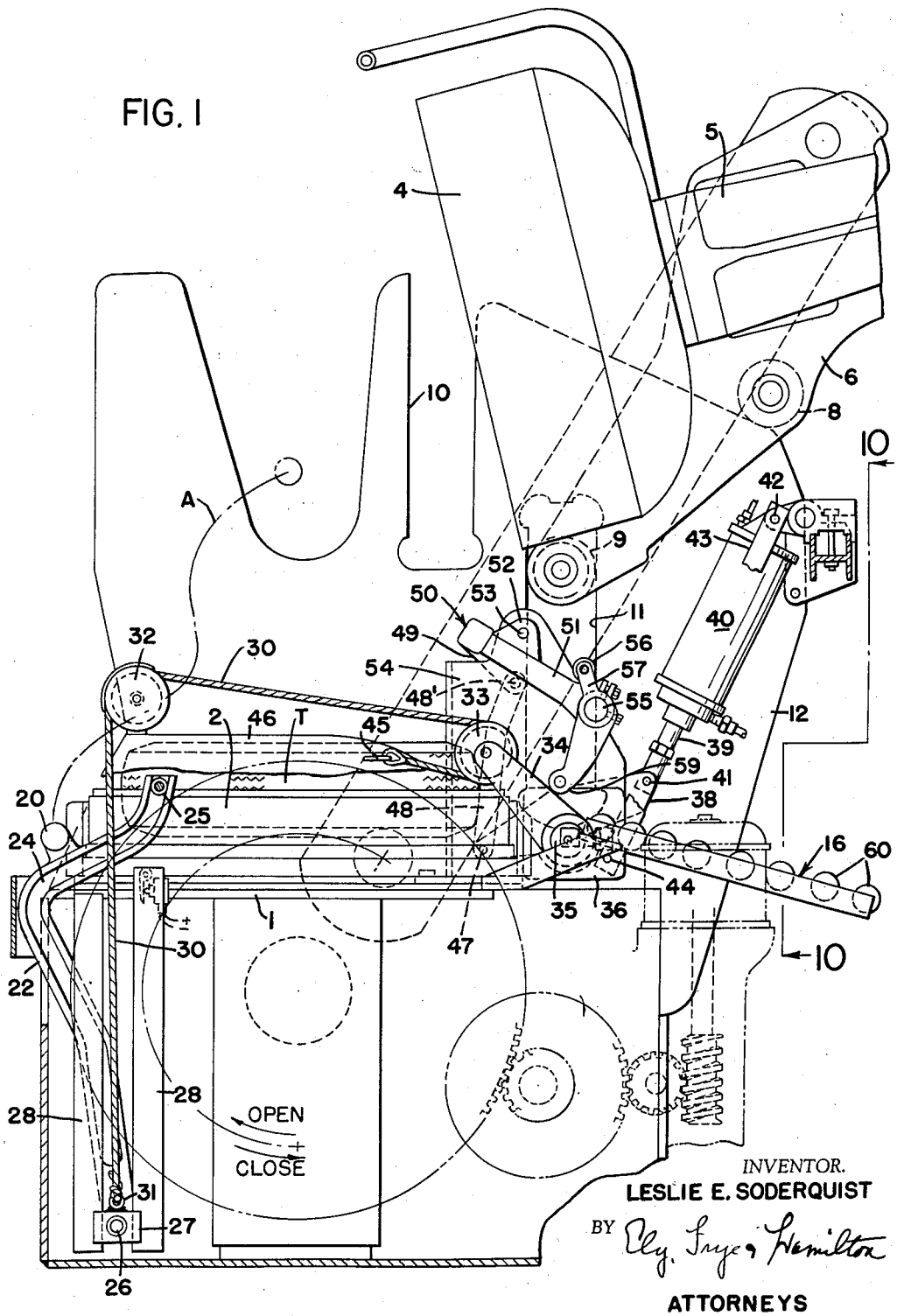
Fig. 1 is a side elevation of a press embodying the invention, with the upper mold section raised, as at the end of the curing operation, and the cured tire still resting in the lower mold section.

As shown in Fig. 1, the cross head is carried by a pair of plates 6 at either side of the press, and the plates are supported and guided by rollers 8 and 9 which move in slots 10 and 11, respectively, in side plates 12 attached to the bed of the press. The cross head is raised and lowered by link mechanism as shown in said Patent No. 2,808,618, so that during the latter part of the closing movement and the first part of the opening movement the two mold sections are kept in parallelism, while during the balance of the movement a rocking motion is generated by the movement of rollers 8 over the backwardly inclined upper edges of the frames 12.

The diaphragm 15, shown collapsed within the tire in Fig. 4 and expanded or elongated in Fig. 5, is actuated by any suitable type of mechanism well known in the art, such as, for example, as shown in said Patent No.

Figure 2:
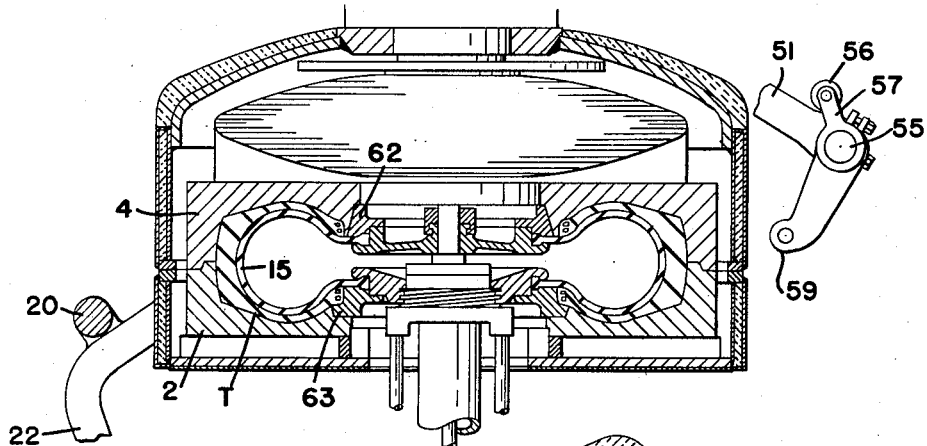
Fig. 2 is a fragmentary cross sectional view showing the mold sections closed, as during the curing operation.

2,808,618. After the tire T has been cured in the closed press as shown in Fig. 2, and the press has opened by raising the upper mold section, the diaphragm is raised to strip the tire T from the lower mold section, as shown in Fig. 4. At this point the stripping arms are moved up under the tire to engage and push upwardly on the tire, and the arms pause momentarily in that position to allow deformation of the tire to break the seal with diaphragm around the upper bead. After the seal is broken, the upper bead of the diaphragm is raised to strip it from the tire as the arms continue to raise the tire to a predetermined height, the extended diaphragm is lowered until its lower head seats in the lower mold section and its upper bead is level with the lower bead of the tire, whereupon the front lifting arms tilt the tire to slide it rearwardly over the diaphragm. As shown in Fig. 1, a discharge roller conveyor indicated generally at 16, may be provided on the rear side of the press for guiding the tires from the press.

The stripping arms which support and raise the tire as the diaphragm is stripped therefrom, comprise front and rear arms located on opposite sides of the diaphragm. The front arm tilts the tire to unload it, after the diaphragm has been stripped and lowered in extended position. The front arm is preferably a steel bar 20 extending across the front of the press, and supported at its ends on long reversely curved arms 22 extending upwardly on either side of the press. The outer face of each arm 22 is an open channel 24 which acts as a cam rail to guide the arm in its upward and downward movements, and the particular curvature of the arms is designed to guide the bar 20 in a path which is essential to proper stripping and removal of the tire. Cam rollers 25 are journaled in suitable brackets on each side of the press and are located in the channels 24, so as to guide the arms during their upward and downward movements.

The lower end of each arm 22 has a stub shaft 26 journaled therein, and a block or carriage 27 is mounted on said shaft and slidably engages between two laterally spaced vertical rails 28 rigidly mounted on the side of the press. A cable 30 attached to each block 27 by an eyebolt 31 is trained over a sheave 32 rotatably mounted on the frame of the press, and mechanism is provided for raising and lowering the cable and block to raise and lower the front arm 20 in its prescribed path as guided by the arms 22 engaging the cam rollers 25.

Figure 10:
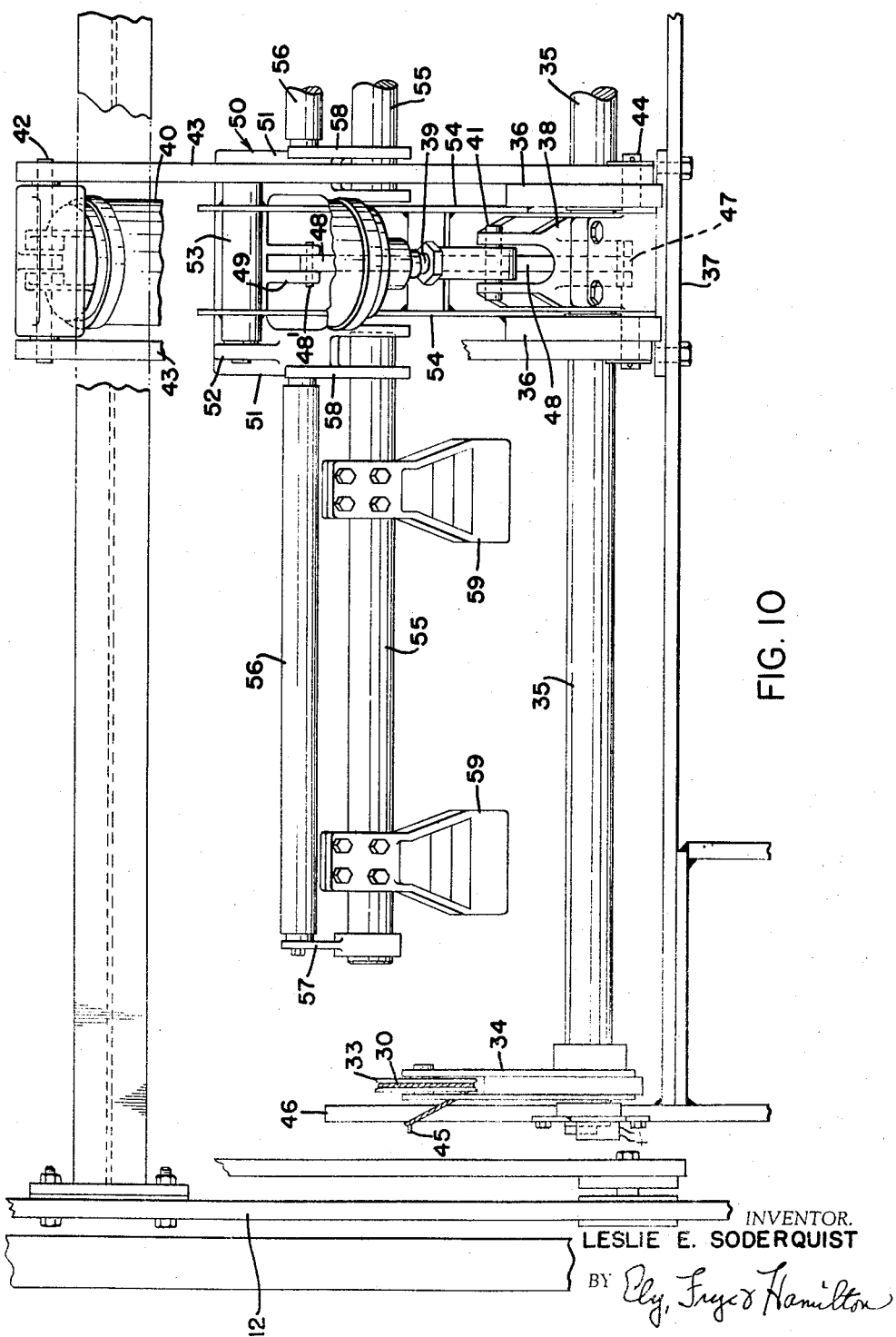
Fig. 10 is a rear fragmentary elevation on line 10—10 of Fig. 1 showing the linkage for operating the lifting arms.

The cable 30 passes from sheave 32 rearwardly to and around a movable sheave 33 rotatably mounted on the outer end of a rocking arm 34, which is fixed to the outer end of a rock shaft 35 extending across the rear side of the press (Fig. 10). In a dual press the shaft 35 may extend across and serve both presses, the central portion of the shaft being journaled in laterally spaced bearing plates 36 supported on a horizontal plate 37 which may be an extension of the bed 1 at the rear side of the press. Between the bearing plates 36, a bellcrank lever 38 is secured to the shaft, and the piston rod 39 of a hydraulic cylinder 40 is pivotally connected by pin 41 to one end of the lever 38. The upper end of the cylinder 40 is pivoted on a shaft 42 carried on the frame of the press and stabilizer bars 43 extend along opposite sides of the cylinder, being secured at their lower ends to the bearing plates 36, by pins 44, and connected at their upper ends to the shaft 42.

The cable is looped around sheave 33 and extends forwardly to where its end is anchored to an eye 45 on the upper part of a side plate 46 on the press. The sheave is rotated by the rocking arm 34 through an extensive arc, as seen by comparing Fig. 1 with Fig. 8, and this movement raises and lowers the carriage blocks 27 and the arms 22 therewith. During this movement, the horizontal front stripping arm 20 follows a path indicated by the chain line A in Fig. 1. The mechanism thus far described has been disclosed in said Patent No. 2,832,992, and per se forms no part of the present invention.

The rear stripping arm is operated by a linkage actuated by the rock shaft 35. The bell crank lever 38 has its rear end connected to the piston rod 39 of hydraulic cylinder 40, as previously described, and the front end of the lever is pivotally connected by a pin 47 to a link 48, the upper end of which is pivoted to a clevis 49 on the central part of an inverted U-shaped crank member 50. The crank 50 has crank arms 51 at opposite sides at the upper ends of which are ears 52 rotatably supported on a shaft 53 which is carried intermediate its ends on laterally spaced vertical plates 54, supported at their lower ends on the bearing plats 36 which are in turn supported on the frame plate 37 of the press.

The lower ends of the crank arms 51 carry the inner ends of two horizontal shafts 55 which extend across the rear of the two mold sections of a dual press and form the main body of the rear stripper arms. Each shaft 55 has a conveyor roller 56 supported in parallelism therewith by bracket arms 57 and 58 extending radially from the ends of the shaft, and a pair of tire engaging bracket arms 59 adjustable along the shaft and extending radially from the shaft in substantially the opposite direction. The arms 59 are spaced laterally so as to clear the diaphragm 15 when it is extended.

In the position of Figs. 1 and 10, the roller 56 is above the shaft 55, and when the shaft is rocked to its uppermost position, as shown in Fig. 8, as the front stripper arm 20 tilts the tire T rearwardly, the roller 56 guides the tire onto the rollers 60 of the discharge conveyor 16, as shown in Fig. 9.

*Operation*

Figure 3:
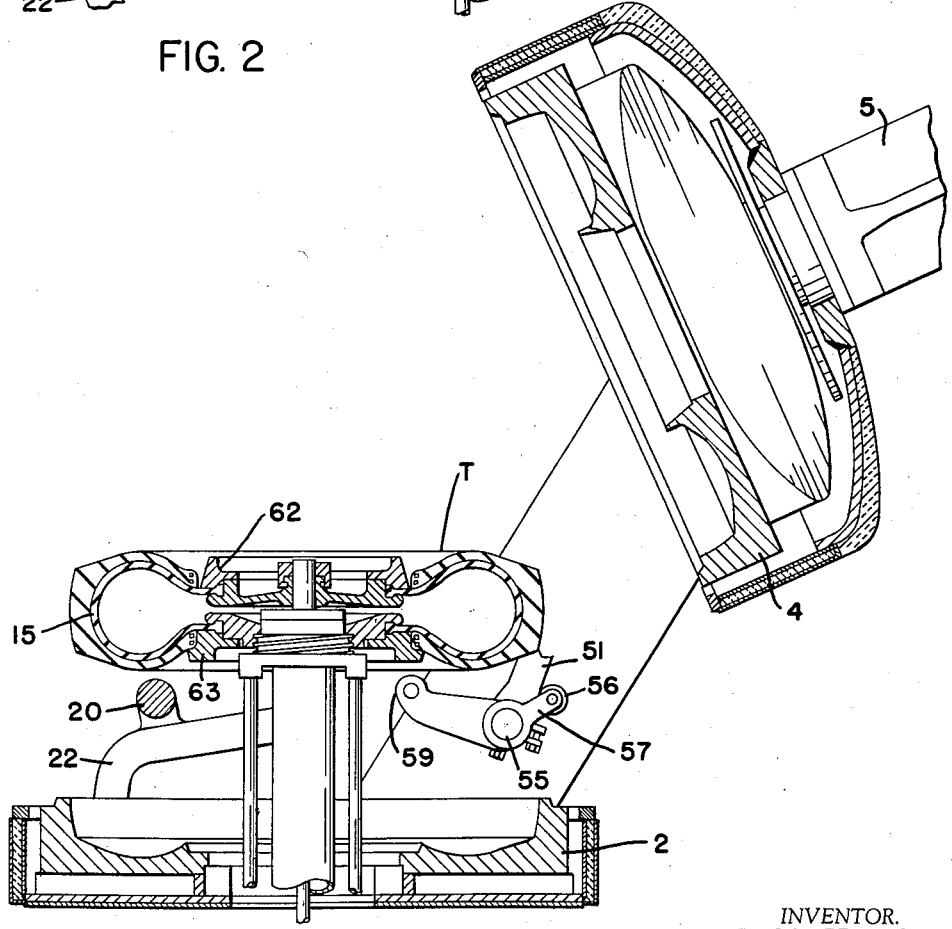
Fig. 3 is a cross sectional view showing the upper mold section raised, and the tire lifted out of the lower mold while the diaphragm is within the tire, the tire being supported on the lower bead ring, and the lifting arms having moved to a position just below the tire.

When the mold has been opened after the curing of the tire is completed, and the tire has been raised above the lower mold section to the position of Fig. 3 by the diaphragm operating mechanism which elevates the upper and lower diaphragm plates 62 and 63 in unison, pressure is admitted to the upper end of hydraulic cylinder 40 to move the piston rod downwardly and rotate the rock shaft 35. This swings the sheaves 33 to the rear and causes the cables 30 to raise the arms 22 and front stripper bar to the position of Fig. 4 where it exerts an upward thrust on the side wall of the tire T. At the same time the lever 38 has been rocked to bring the rear arms 59 into engagement with the side wall of the tire on opposite sides of the lower diaphragm plate 63.

In order to break the vacuum seal between the diaphragm 15 and the tire before the diaphragm is stripped from the tire, so as to avoid buckling or other damage to the tire beads, mechanism is provided momentarily to stop the upward movement of the arms 22 and 59 in the position of Fig. 4, to allow the tire to flex and deform in response to the upward thrust of the arms and break the upper tire bead free from the diaphragm as shown. After the seal is broken, the upper diaphragm plate 62 is raised to extend the diaphragm and strip it from the tire as indicated in Fig. 5, whereupon the arms 22 and 59 continue their upward movement to raise the tire to the position of Fig. 6.

At this point, the arms are again stopped momentarily, and the lower diaphragm plate 63 is lowered by its operating mechanism to seat it in the lower mold section, the upper diaphragm plate 62 being located within or below the lower bead of the tire, as shown in Fig. 7. When the diaphragm has been seated in the lower mold section, the cylinder 40 operates the lever 38 to continue to raise the arms 22 from the position of Fig. 7 to the position of Figs. 8 and 9 to tilt the tire rearwardly over the diaphragm and dump it onto the conveyor rolls 60.

As the lever 38 swings from the position of Fig. 7 to the position of Fig. 8, the rear supporting arms 59 rise slightly to the dotted line position shown in Fig. 8 at the point when the pivot 47 is in a straight line between rock shaft 35 and the upper pivot 48' of link 48 with clevis 49. As the pivot 47 swings out of line or "over center" with respect to the shaft 35 and pivot 48', the arms 59 drop back to their full line position of Fig. 8, during which time the front stripper arm 20 is tilting the tire rearwardly over the diaphragm to slide it over the roller 56.

Figure 11:
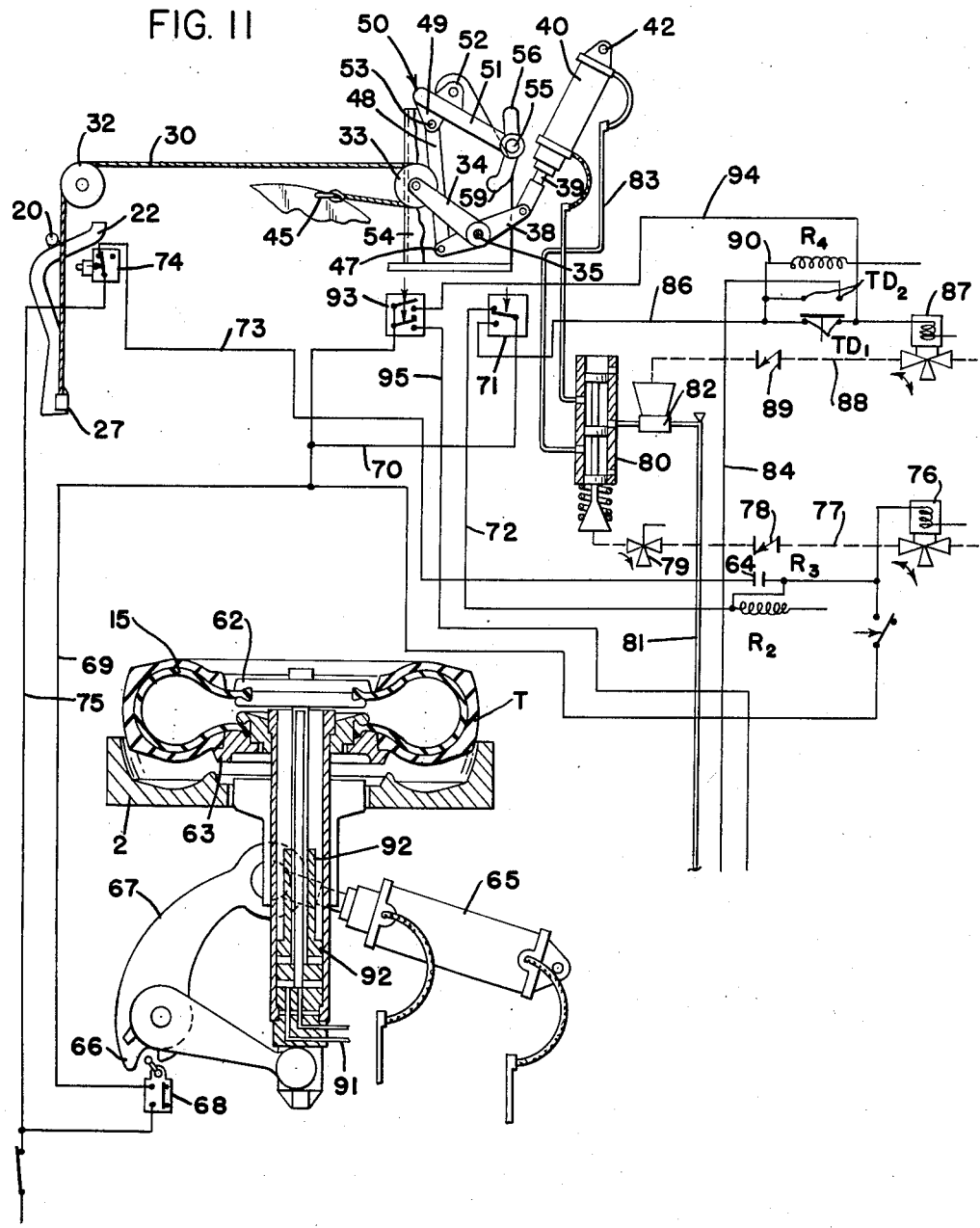
Fig. 11 is a diagrammatic view showing the electrical circuit for controlling the fluid pressure lines to operate the lifting arms during the tire stripping and ejecting operation.

Referring to the diaphragm of the control mechanism for the lifting arms shown in Fig. 11, when the lower diaphragm plate 63 has been elevated to its maximum height by operation of the usual hydraulic cylinder 65, stripping the tire from the lower mold section 2, the projection 66 on the lever arm 67 actuates and closes the limit switch 68. Current then flows through conductors 69 and 70, limit switch 71 and conductor 72 to energize relay $R_2$ and energizes solenoid 76 to open the compressed air line 77. Energizing relay $R_2$ closes the normally open contacts 64 thereof, and current flows through conductor 73, switch 74 and conductor 75 to hold the solenoid valve 76 energized when switch 71 is later opened.

Air then passes freely through control valve 78 which retards flow in the opposite direction, and through normally controlled three-way valve 79, to actuate the piston of hydraulic valve 80 upwardly and admit fluid into the upper end of cylinder 40 from supply conduit 81 through normally open valve 82 and conduit 83. This forces the piston rod 39 downwardly and operates the lever 38 to start raising the arms 20 and 55 in a manner previously described.

At the point where the arms just support the tire T, as shown in Figs. 3 and 4, the limit switch 71 is actuated to delay or momentarily stop the upward movement of the arms. Thus, the switch 71 may be referred to as the arms delay switch. As shown in Fig. 1, it may be mounted on a side plate of the press and actuated by a cam 85 rotatably adjustably mounted on the rock shaft 35. This adjustment permits adjustment of the delay point for different sizes of tires. Actuation of the switch 71 sends current through conductor 86 to energize solenoid controlled valve 87, the contacts $TD_1$ of the time delay relay $R_4$ being closed. When the solenoid valve 87 opens, air is applied through line 88 and control valve 89 which also retards flow in the opposite direction to normally open valve 82, shutting off hydraulic supply line 81, and momentarily stopping the travel of piston rod 39 and the lifting arms. At the same time, the relay $R_4$ is energized through conductor 90, and the relay is set to open the contacts $TD_1$ after a predetermined time delay during which the deformation of the tire breaks the vacuum seal between the upper tire bead and the diaphragm.

When the time delay relay $R_4$ operates to close contacts $TD_2$, current flows through conductor 84 to close a circuit (not shown) which applies hydraulic fluid through conduit 91 to the inner piston 92 to raise the upper diaphragm plate 62 and strip it from the tire, as shown in Fig. 5. At the same time, opening the contacts $TD_1$ de-energizes solenoid valve 87, allowing it to exhaust, and after a slight delay due to the retarded reverse flow through control valve 89, the normally open valve 82 opens and flow through conduit 83 causes the lifting arms to continue their upward travel to the position shown in Fig. 6, at which point the double pole limit switch 93 is actuated. This switch may be actuated by a cam (not shown) similar to cam 85, and rotatably adjustably mounted on the opposite end of rock shaft 35.

One half of switch 93 closes a circuit through conductor 94 to solenoid valve 87, again causing the lifting arms to pause. The other half of switch 93 closes a circuit (not shown) through conductor 95 which reverses the operation of cylinder 65, lowering the lower diaphragm plate into the mold section 2, as shown in Fig. 7, and releasing the limit switch 68 to open position which in turn de-energizes solenoid valve 87 and allows the lifting arms to continue their upward travel. The front arms tilt and dump the tire, as shown in Figs. 7–9, and at the upper limit the arms 22 actuate limit switch 74 to de-energize relay $R_2$ and solenoid valve 76, exhausting the air from the valve 80. This allows the valve 80 to return to normal position, reversing the flow to the hydraulic cylinder 40 and lowering the lifting arms to starting position.

It will be apparent from the foregoing description that improved mechanism has been provided for stripping the diaphragm from the cured tire without injuring the tire beads, and the mechanism for operating the tire lifting and dumping arms has been materially improved and simplified.

What is claimed is:

1. In a press for curing tires in sectional molds comprising a lower mold section, an extensible tire shaping diaphragm movable toward and away from said lower mold section, and means to extend the diaphragm to strip it from a cured tire, improved mechanism to elevate a cured tire and cooperate with said diaphragm extending means in stripping the diaphragm from the cured tire, said mechanism including front and rear tire lifting arms, a rock shaft, means to oscillate said rock shaft, linkage means operatively connecting said rock shaft and said rear lifting arm for swinging said arm under said tire to support and elevate the same, means operatively connecting said rock shaft with said front lifting arm for elevating said arm, cooperating cam means on the front arm and the press to guide said front arm during its upward movement under said tire to support said tire and to swing said arm over the diaphragm during the final part of its upward movement, and means for momentarily stopping the rock shaft oscillating means when the lifting arms first engage and support the tire to allow the resulting deformation of the cured tire to break the seal between its upper bead and said diaphragm.

2. In a press for curing tires in sectional molds comprising a lower mold section, an extensible tire shaping diaphragm movable toward and away from said lower mold section, and means to extend the diaphragm to strip it from a cured tire, improved mechanism to elevate a cured tire and cooperate with said diaphragm extending means in stripping the diaphragm from the cured tire, said mechanism including a tire lifting arm, a rock shaft, means to oscillate said shaft, means operatively connecting said arm and shaft for elevating said arm, cooperating cam means on the arm and the press to guide said arm under the tire during the first part of the upward movement of the arm and to swing the arm over the diaphragm during the last part of said upward movement to tilt and dump the tire, and means for momentarily stopping the rock shaft oscillating means when said lifting arm first engages and supports said tire to allow the resulting deformation of the cured tire to break the seal between its upper bead and said diaphragm.

3. In a press for curing tires in sectional molds comprising a lower mold section, an extensible tire shaping diaphragm movable toward and away from said lower mold section, and means to extend the diaphragm to strip it from a cured tire, improved mechanism to elevate a cured tire and cooperate with said diaphragm extending means in stripping the diaphragm from the cured tire, said mechanism including front and rear tire lifting arms, a rock shaft, means to oscillate said rock shaft, linkage means operatively connecting said rock shaft and said rear lifting arm for swinging said arm under said tire to support and elevate the same, means operatively connecting said rock shaft with said front lifting arm for elevating said arm, cooperating cam means on the front arm and the press to guide said front arm during its upward movement under said tire to support said tire and to swing said arm over the diaphragm during the final part of its upward movement, said linkage means being constructed and arranged to maintain the elevation of said rear lifting arm while said front arm swings over the diaphragm, and means for momentarily stopping the rock shaft oscillating means when the lifting arms first engage and support the tire to allow the resulting deformation of the cured tire to break the seal between its upper bead and said diaphragm.

4. In a press for curing tires in sectional molds comprising a lower mold section, an extensible tire shaping diaphragm movable toward and away from said lower mold section, and means to extend the diaphragm to strip it from a cured tire, improved mechanism to elevate a cured tire and cooperate with said diaphragm extending means in stripping the diaphragm from the cured tire, said mechanism including a tire lifting arm movably mounted on the press, means to elevate said arm, means to guide said arm under the tire to support the same during the first part of the upward movement of the arm, and adjustable means for momentarily stopping the arm elevating means when said arm first engages and supports said tire to allow the resulting deformation of the cured tire to break the seal between its upper bead and said diaphragm.

5. In a press for curing tires in sectional molds comprising a lower mold section, and an extensible tire shaping diaphragm movable toward and away from said lower mold section, improved mechanism to elevate a cured tire above said mold section and strip the diaphragm therefrom, said mechanism including a tire lifting arm movably mounted on the press, means to elevate said arm, means to guide the arm under the cured tire to support the tire during the first part of the upward movement of the arm and to swing the arm over the upper part of the extended diaphragm during the last part of the upward movement of the arm to tilt and dump the tire, means for momentarily stopping the arm elevating means when said arm first engages the tire to allow its deformation to break the seal between its upper bead and the diaphragm, and means to extend the diaphragm after the seal is broken.

6. In a press for curing tires in sectional molds comprising a lower mold section and an extensible tire shaping diaphragm movable toward and away from said lower mold section, improved mechanism to elevate a cured tire above said mold section and strip the diaphragm therefrom, said mechanism including a tire lifting arm movably mounted on the press, means to elevate said arm, means to guide the arm under the cured tire to support the tire during the first part of the upward movement of the arm and to swing the arm over the upper part of the extended diaphragm during the last part of the upward movement of the arm to tilt and dump the tire, means for momentarily stopping the arm elevating means when said arm first engages the tire to allow its deformation to break the seal between its upper bead and the diaphragm, means to extend the diaphragm after the seal is broken, means for again momentarily stopping the arm elevating means immediately prior to the final swinging movement of said arm, and means to lower the extended diaphragm below said tire during said latter pause of the arm elevating means.

7. In a press for curing tires in sectional molds comprising a lower mold section and an extensible tire shaping diaphragm movable toward and away from said lower mold section, improved mechanism to elevate a cured tire above said mold section and strip the diaphragm therefrom, said mechanism including front and rear tire lifting arms movably mounted on the press, means to elevate said arms, means to guide the front arm under the cured tire to support the tire during the first part of the upward movement of said front arm, linkage means operatively connecting said rear arm with said arm elevating means to swing the rear arm under the tire to support and elevate the tire, and means for momentarily stopping the arm elevating means when said front and rear arms first engage the tire to allow its deformation to break the seal between its upper bead and the diaphragm.

8. In a press for curing tires in sectional molds comprising a lower mold section and an extensible tire shaping diaphragm movable toward and away from said lower mold section, improved mechanism to elevate a cured tire above said mold section and strip the diaphragm therefrom, said mechanism including front and rear tire lifting arms movably mounted on the press, means to elevate said arms, means to guide the front arm under the cured tire to support the tire during the first part of the upward movement of said front arm and to swing said arm over the upper part of the extended diaphragm during the last part of the upward movement of said arm to tilt and dump the tire, linkage means operatively connecting said rear arm with said arm elevating means to swing the rear arm under the tire to support and elevate the tire, means for momentarily stopping the arm elevating means when said front and rear arms first engage the tire to allow its deformation to break the seal between its upper bead and the diaphragm, and means to extend the diaphragm after the seal is broken.

9. In a press for curing tires in sectional molds comprising a lower mold section and an extensible tire shaping diaphragm movable toward and away from said lower mold section, improved mechanism to elevate a cured tire above said mold section and strip the diaphragm therefrom, said mechanism including front and rear tire lifting arms movably mounted on the press, means to elevate said arms, means to guide the front arm under the cured tire to support the tire during the first part of the upward movement of said front arm and to swing said arm over the upper part of the extended diaphragm during the last part of the upward movement of said arm to tilt and dump the tire, linkage means operatively connecting said rear arm with said arm elevating means to swing the rear arm under the tire to support and elevate the tire, means for momentarily stopping the arm elevating means when said front and rear arms first engage the tire to allow its deformation to break the seal between its upper bead and the diaphragm, means to extend the diaphragm after the seal is broken, means for again momentarily stopping the arm elevating means immediately prior to the final swinging movement of said front arm, and means to lower the extended diaphragm below said tire during the latter pause of the arm elevating means.

10. In a press for curing tires in sectional molds comprising a lower mold section and an extensible tire shaping diaphragm movable toward and away from said lower mold section, improved mechanism to elevate a cured tire above said mold section and strip the diaphragm therefrom, said mechanism including front and rear lifting arms movably mounted on the press, a rock shaft rotatably mounted on the press, means to oscillate said shaft, means operatively connecting said rock shaft with said front lifting arm to elevate said arm, means to guide the front arm under the cured tire to support the tire during the first part of the upward movement of said front arm and to swing said arm over the diaphragm during the last part of the upward movement of said arm to tilt and dump the tire, linkage means operatively connecting said rock shaft with said rear arm to swing said arm under said tire to support and elevate the tire, means for momentarily stopping the rock shaft oscillating means when the lifting arms first engage and support the tire to allow its deformation to break the seal between its upper bead and the diaphragm, means to extend the diaphragm after the seal is broken, and means for momentarily stopping the rock shaft oscillating means immediately prior to the final swinging movement of the front arm.

References Cited in the file of this patent

UNITED STATES PATENTS 2,832,992     Soderquist _____ May 6, 1958

UNITED STATES PATENT OFFICE
CERTIFICATE OF CORRECTION

Patent No. 2,911,670                                        November 10, 1959

Leslie E. Soderquist

It is hereby certified that error appears in the printed specification of the above numbered patent requiring correction and that the said Letters Patent should read as corrected below.

Column 4, line 14, for "plats 36" read -- plates 36 --; column 5, line 6, for "diaphragm" read -- diagram --.

Signed and sealed this 10th day of May 1960.

(SEAL)
Attest:

KARL H. AXLINE                                               ROBERT C. WATSON
Attesting Officer                                           Commissioner of Patents